United States Patent [19]

Yamaguchi

[11] Patent Number: 5,328,122
[45] Date of Patent: Jul. 12, 1994

[54] HANDLE FOR FISHING REEL
[75] Inventor: Akira Yamaguchi, Tokyo, Japan
[73] Assignee: Daiwa Seiko, Inc., Tokyo, Japan
[21] Appl. No.: 925,757
[22] Filed: Aug. 7, 1992
[30] Foreign Application Priority Data
   Aug. 23, 1991 [JP] Japan .................. 3-074709[U]
[51] Int. Cl.⁵ ............................................ A01K 89/00
[52] U.S. Cl. .................................. 242/283; 74/545;
                                                      16/114 R
[58] Field of Search ............... 242/283, 284; 74/545,
                                   74/546, 547; 16/114 R, 118, 121

[56] References Cited

U.S. PATENT DOCUMENTS

| | | | |
|---|---|---|---|
| 2,184,149 | 3/1938 | Marr | 242/283 X |
| 2,316,266 | 4/1943 | Marr | 242/283 X |
| 3,905,249 | 9/1975 | Murvall | 74/545 X |
| 3,989,204 | 11/1976 | Lemery | 242/283 X |
| 4,155,517 | 5/1979 | Sazaki | 74/547 X |

FOREIGN PATENT DOCUMENTS

| | | | |
|---|---|---|---|
| 363290 | 4/1990 | European Pat. Off. | 242/283 |
| 56-21971 | 2/1981 | Japan . | |
| 58-96783 | 7/1983 | Japan . | |
| 352896 | 7/1931 | United Kingdom | 74/545 |
| 2134761 | 8/1984 | United Kingdom | 242/283 |

Primary Examiner—Daniel P. Stodola
Assistant Examiner—Eileen A. Dunn
Attorney, Agent, or Firm—Longacre & White

[57] ABSTRACT

A small diameter part (2a) of a support shaft (2) is inserted or pressure-inserted into a through hole (1a) of a handle arm (1) and fixed by caulking so that the support shaft (2) protrudes on the side face of the handle arm (1). A hollow shaft part (3) is rotatably fitted to an outer periphery of a shaft part (2b) of the support shaft (2) through a washer (10). The hollow shaft part (3) is prevented from falling off from the support shaft (2) by an E-ring (12) fitted to the other side of the support shaft (2) through a washer (11). Since the hollow shaft part (3) is arranged to be detachably supported onto the support shaft (2), the frictional resistance in rotation between the support shaft (2) and the hollow shaft part (3) can be reduced through maintenance such as washing and lubrication.

9 Claims, 6 Drawing Sheets

HANDLE FOR FISHING REEL

BACKGROUND OF THE INVENTION

The present invention relates to a handle for a fishing reel to wind up a fishing line on a spool.

As is disclosed in (1) Japanese Unexamined Utility Model Publication No. 56-21971 and (2) Japanese Unexamined Utility Model Publication No. 58-96783, there has been well known a handle for a fishing reel, which comprises a handle arm, a support shaft projectingly fixed by caulking onto the handle arm and a handle knob provided on a hollow shaft part rotationally and un-removably fitted around an outer periphery of the support shaft.

According to the above-mentioned arrangement, it is necessary to provide a fitting clearance along an entire length between the hollow shaft part and the support shaft for the purpose of rotationable support.

Accordingly, during the winding operation of a fishing line, sea water, water and mucus of fish (covering on the surface of fish) adhering onto fisherman's hand, the residual bait adhering onto fisherman's hand, sand or the like is likely to enter the clearance between the support shaft and the hollow shaft part. When such a foreign matter enters the clearance, sticking occurs or the frictional resistance in rotating the handle knob becomes large because of clogging of the clearance. Therefore, smooth winding operation cannot be performed with the handle knob gripped by hand.

Further, according to the conventional construction, since the handle knob cannot be detached from the support shaft even when the sticking is generated or the clearance is clogged with the foreign matter to increase the frictional resistance in rotating the handle knob as described above, it has been impossible to carry out maintenance and thus, it has been necessary to replace the handle with a new one.

The problem to be solved by the present invention resides in that the winding operation cannot be smoothly performed with the handle knob gripped by hand because of an influence of the frictional resistance on the rotation of the hollow shaft part.

SUMMARY OF THE INVENTION

Therefore, an object of the present invention is to provide a handle for a fishing reel which overcomes the deficiency of the conventional art and which is capable of detachably supporting a hollow shaft part provided with a handle knob onto a support shaft protruding on a handle arm, to thereby enable maintenance such as washing, lubrication, etc., decrease frictional resistance in rotation between the support shaft and the hollow shaft part and operate a handle with smoothness.

A handle for a fishing reel in accordance with the present invention preferably includes a handle arm, a support shaft protruding on a side face of the handle arm and a hollow shaft part having a handle knob which is rotatably supported on the outer periphery of the support shaft, the hollow shaft part being detachably supported relative to the handle arm.

Another handle for a fishing reel in accordance with the present invention preferably includes a handle arm, a support shaft protruding on a side face of the handle arm, and a hollow shaft part having a handle knob, the hollow shaft part being rotatably supported on the support shaft through bearings.

With the detachable arrangement between the hollow shaft part and the handle arm, the maintenance such as washing and lubrication can be performed to maintain the smooth rotation between the support shaft and the hollow shaft part for a long time.

Further, with the bearing support arrangement between the hollow shaft part and the support shaft, the rotational resistance during fishline wind-up operation can be extremely reduced to provide the smooth rotation therebetween.

BRIEF DESCRIPTION OF THE DRAWINGS

The present invention will become more apparent from the following description of the preferred embodiments, with reference to the accompanying drawings, in which.

DETAILED DESCRIPTION OF THE PREFERRED EMBODIMENTS

Embodiments of the present invention will be described in more detail.

Figure 1:
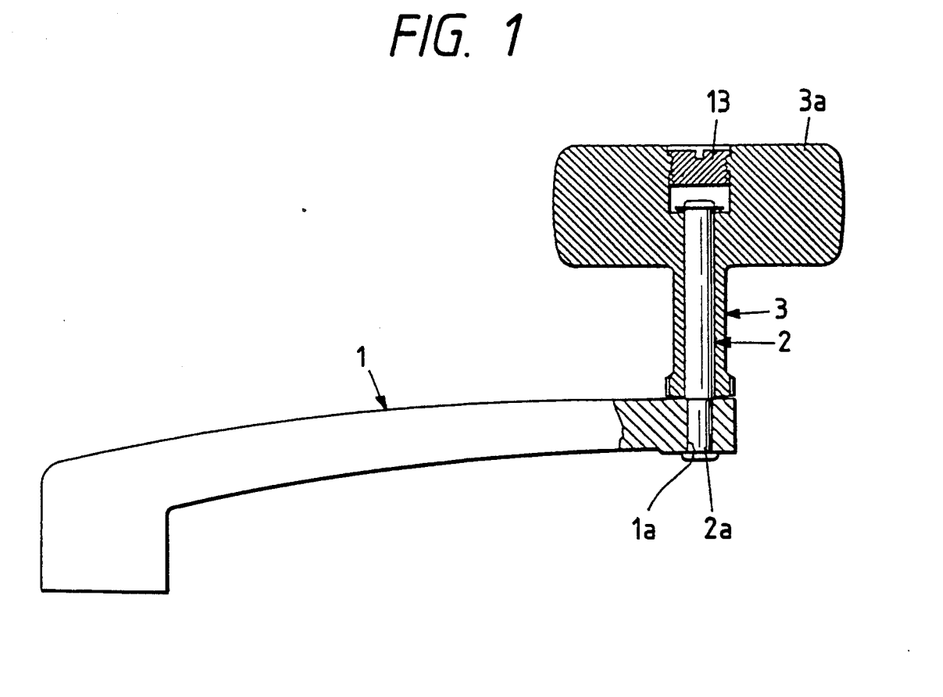
FIG. 1 is a longitudinally sectional view of a main part of a handle of a first embodiment.
Figure 2:
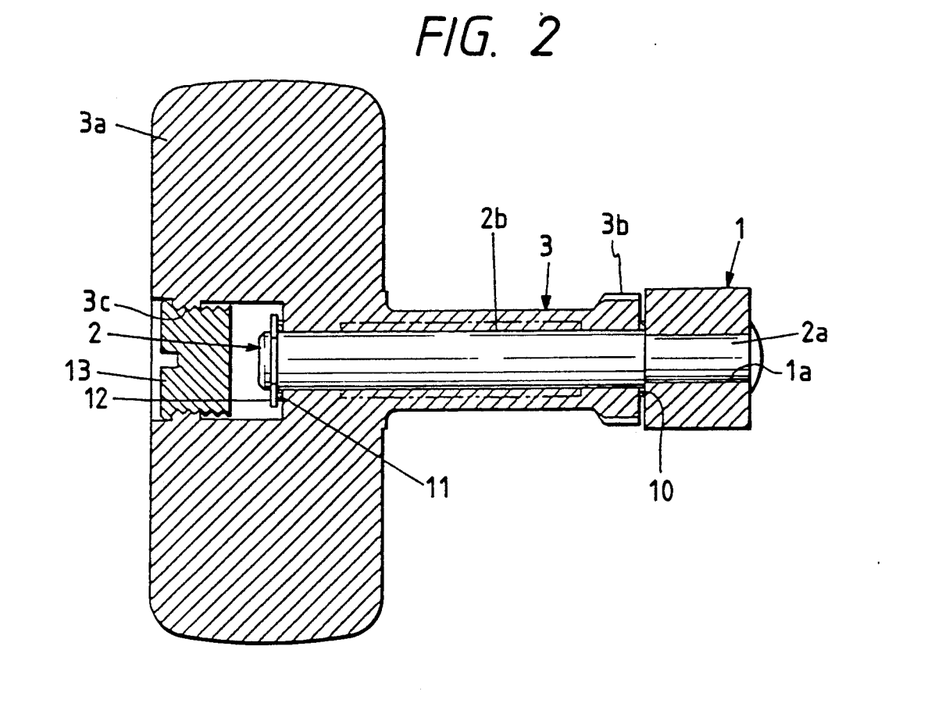
FIG. 2 is an enlarged, longitudinally sectional view of the handle.

FIGS. 1 and 2 show a first embodiment of a handle for a fishing reel. FIG. 1 is a longitudinally sectional view of a main part of the handle and FIG. 2 is an enlarged, longitudinally sectional view of the handle.

In the handle for the fishing reel shown in FIGS. 1 and 2, a small diameter part 2a of a support shaft 2 is pressure-inserted or fitted into a through hole 1a of a handle arm 1, and then fixed by caulking so that the support shaft 2 protrudes on the side face of the handle arm 1.

A hollow shaft part 3 is rotatably fitted to an outer periphery of a shaft part 2b of the support shaft 2 with a washer 10 interposed between the hollow shaft part 3 and the handle arm 1. The hollow shaft part 3 is prevented from falling off therefrom by means of an E-ring 12 fitted to the other side of the support shaft 2 with a washer 11 interposed between the E-ring 12 and the hollow shaft part 3.

The hollow shaft part 3 is made of metal or hard synthetic resin and formed integrally with a handle knob 3a and a nut part 3b of polygonal shape in its outer periphery.

The handle knob 3a is formed at a center of the other side thereof with a female thread 3c with which a dressed plug 13 is threadingly engaged.

An inner diametrical portion of the hollow shaft 3 where the support shaft is fitted may be formed such that a longitudinally intermediate part thereof is removed as shown by two-dot chain lines of FIG. 2.

The handle thus constructed can be assembled such that the washer 10, the hollow shaft part 3 and the washer 11 are fitted in this order to the outer periphery of the shaft part 2b of the support shaft 2, the E ring 12 is then attached to the support shaft 2 and the dressed plug 13 is threaded to the handle knob 3a. The handle can be disassembled in a reversed order thereto.

Since the hollow shaft part 3 can be detached from the support shaft 2, maintenance such as washing, lubrication, etc., can be achieved.

In operating the handle, a fisherman grasps and rotates the handle knob 3a located at a planetary position with respect to the handle arm 1 to rotate a spool not shown in the drawings through the handle arm 1 and the support shaft 2.

Owing to the construction of the fishing reel handle as mentioned above, the maintenance such as washing, lubrication, or the like can be performed to decrease the frictional rotation resistance between the support shaft 2 and the hollow shaft part 3, so that the winding operation can be lightly and smoothly carried out with the handle knob 3a gripped by hand.

Further, in a case where the intermediate part of the hollow shaft part 3 is removed as shown by two-dot chain lines in FIG. 2, the removed part of the hollow shaft part 3 is separated from the outer periphery of the shaft part 2b of the support shaft 2 to decrease a contact area, so that the rotating operation of the handle does not become heavy but the winding operation of a fishing line can be performed lightly even when large load is exerted on the hollow shaft part.

Figure 3:
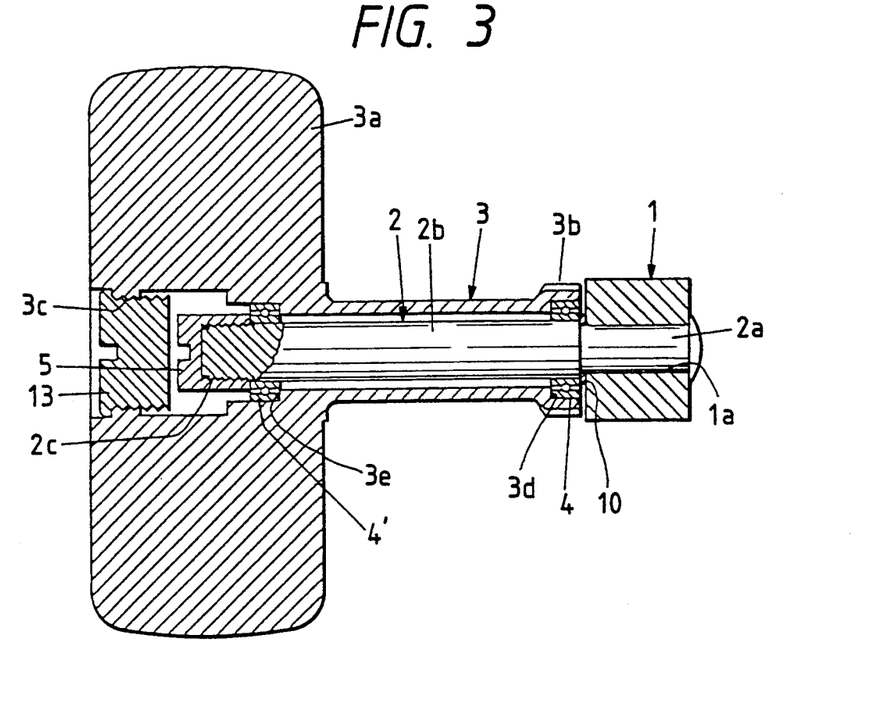
FIG. 3 is a longitudinally sectional view of a main part of a handle of a second embodiment.
Figure 4:
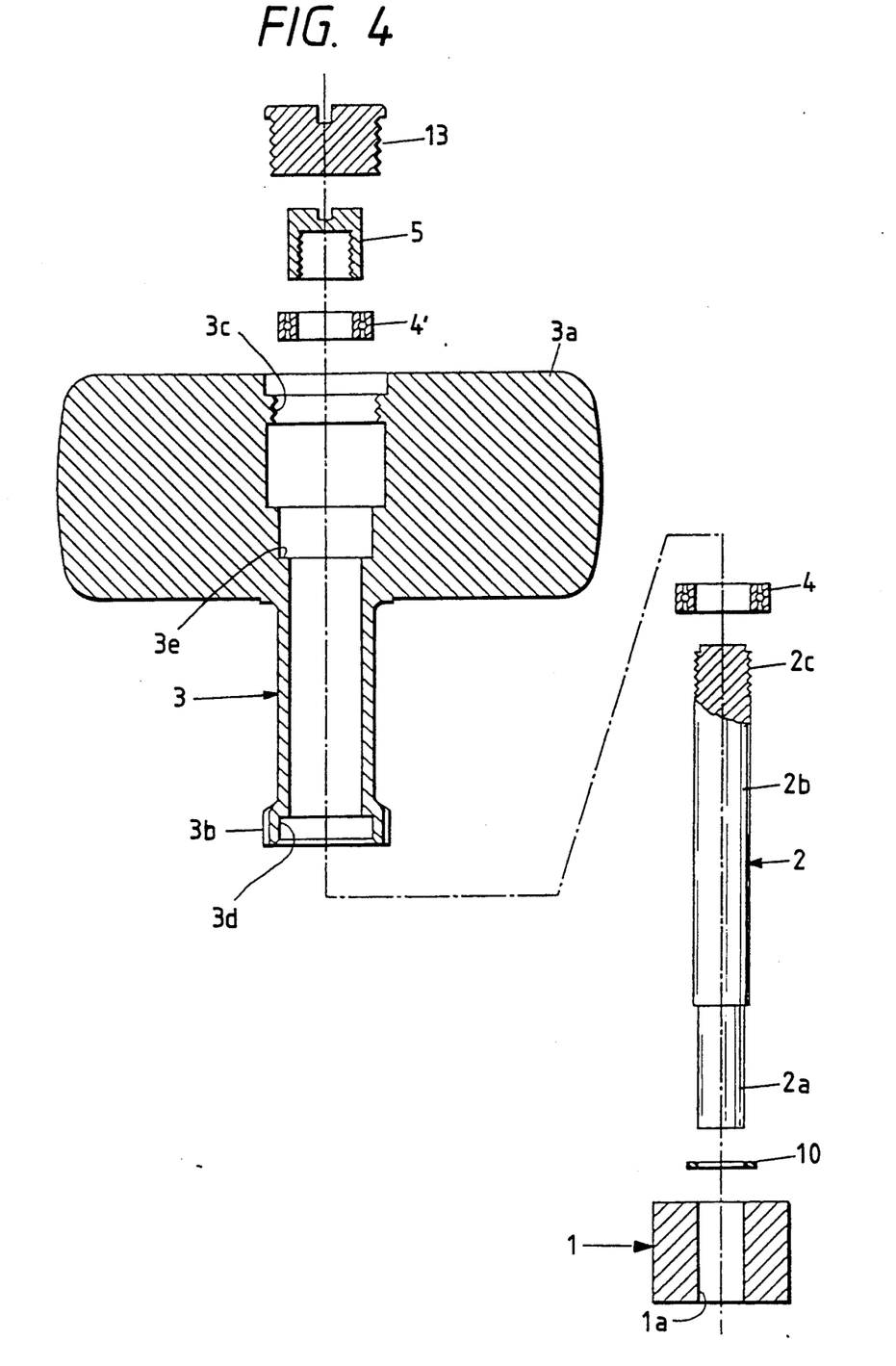
FIG. 4 is an exploded, longitudinally sectional view of the above described handle.

FIGS. 3 and 4 show a second embodiment of a handle for a fishing reel.

FIG. 3 is a longitudinally sectional view of a main part of the handle and FIG. 4 is an exploded, longitudinally sectional view of the handle.

In this embodiment, the hollow shaft part 3 is radially separated from the support shaft 2, and bearing members 4, 4' are provided between an outer periphery of the shaft part 2b of the support shaft 2 and the inner periphery of the hollow shaft part 3 so that the hollow shaft part 3 is detachably supported onto the support shaft 2.

As shown in FIGS. 3 and 4, the outer periphery of the support shaft 2 is formed into a small part 2a at one side, the shaft part 2b at an intermediate part and a threaded part 2c at the other side.

The small diameter part 2a of the support shaft 2 is inserted or pressure-inserted into the through hole 1a of the handle arm 1 and fixed by caulking so that the support shaft 2 protrudes on the side face of the handle arm 1.

A cap nut 5 is threadingly engaged with the threaded part 2c.

The hollow shaft part 3 is formed integrally with the handle knob 3a and the nut part 3b of polygonal shape in its outer periphery.

The internal or female thread 3c is formed at the center of the other side of the handle knob 3a. A dressing plug 3c is threaded to the internal thread 3c.

The inner diameter of the hollow shaft part 3 is larger than the outer diameter of the shaft part 2b of the support shaft 2. The hollow shaft part 3 is formed at its one end of the inner periphery with a recessed part 3d into which the bearing member 4 is fitted and at its other end thereof with a step part 3e into which the bearing member 4' is fitted.

The bearing members 4, 4' shown in FIGS. 3 and 4 are constituted of ball bearings.

When the handle for the fishing reel according to the second embodiment of the invention is assembled, the washer 10 and the bearing member 4 are fitted to the outer periphery of the shaft part 2b of the support shaft 2 fixed by caulking to the handle arm 1. The support shaft 2 is inserted into the hollow shaft part 3 so that the bearing member 4 is fitted into the recessed part 3d.

Next, the bearing member 4' is fitted to the outer periphery of the shaft part 2b of the support shaft 2 so as to be fitted into the step part 3e. The cap nut 5 is threaded to the threaded part 2c of the support shaft 2. Then, the dressed plug 13 is threaded to the internal thread 3c.

When the handle of the reel for fishing is rotated, the handle knob 3a is located at a planetary position relative to the handle arm 1 similarly to the first embodiment. When this handle knob 3a is gripped and rotated by hand to rotate the handle arm 1 and the support shaft 2, a spool not shown is rotated.

During this operation, the support shaft 2 is rotated by the handle knob 3a through the bearing members 4, 4'.

In the handle of the fishing reel thus constructed, maintenance such as washing, lubrication, etc., can be easily performed. Since the inner periphery of the hollow shaft part 3 is radially separated from the outer periphery of the shaft part 2b of the support shaft 2 and the hollow shaft part 3 is supported by the shaft part 2b of the support shaft 2 through the bearing members 4, 4', the rotating operation of the handle does not become heavy even when large load is exerted on the hollow shaft part. Further, the residue of bait or sand is prevented from entering into a clearance between the hollow shaft part 3 and the shaft part 2b. Even when sea water, water, the mucus of fish adhering to the hand or the like enters into the clearance, the sticking of the foreign matter is not generated nor the clearance is clogged with the foreign matter. Therefore, frictional resistance in rotation of the hollow shaft part 3 is not increased and the winding operation of a fishing line can be smoothly performed while the handle knob 3a is gripped by hand.

According to the aforementioned conventional examples (1) and (2), since a contact area between the entire outer periphery of the support shaft and the hollow shaft part is large, the rotating operation of the handle becomes heavy particularly when large load is exerted on the hollow shaft part. Therefore, the winding operation of the fishing line cannot performed lightly. However, according to the present invention, this defect can be overcome.

Figure 5:
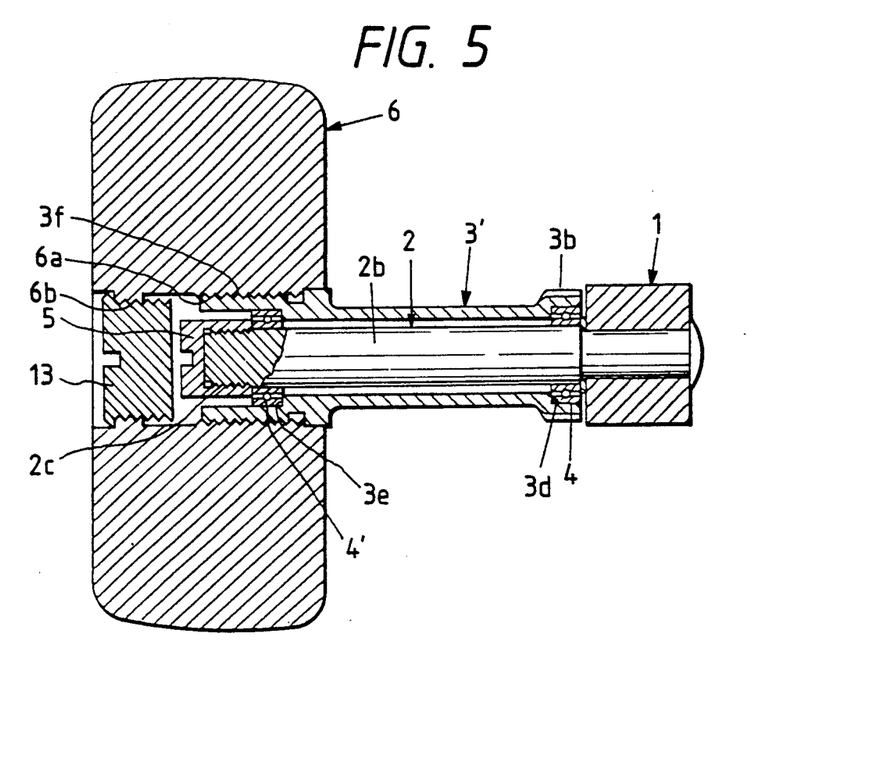
FIG. 5 is a longitudinally sectional view of a main part of a handle of a third embodiment.

FIG. 5 shows a third embodiment of a handle for a fishing reel according to the invention. FIG. 5 is a longitudinally sectional view of a main part of a handle.

FIG. 5 shows a handle in which a handle knob is separately formed from a hollow shaft part and threaded thereto to form a one-piece structure.

In FIG. 5, the handle knob 6 is made of, for example, synthetic resin and has an internally threaded part 6a on an inner periphery thereof. An internal thread 6b is formed at the center of the other side on the handle knob 6. A dressed plug 13 is threaded to the internal thread 6b.

A hollow shaft part 3' is made of, for example, metal. The inner diameter of the hollow shaft part 3' is larger than the outer diameter of the shaft part 2b of the support shaft 2. One end of the hollow shaft part 3' is formed such that its inner periphery has a recessed part 3d into which a bearing member 4 is fitted and its outer periphery has a nut part 3b of polygonal shape. The other end of the hollow shaft part 3' is formed such that its inner periphery has a step part 3e into which a bearing member 4' is fitted and its outer periphery has an externally threaded part 3f.

The internally threaded part 6a of the handle knob 6 is threaded to the externally threaded part 3f.

Other construction is substantially the same as that of the second embodiment of the invention as shown in FIG. 3.

Figure 6:
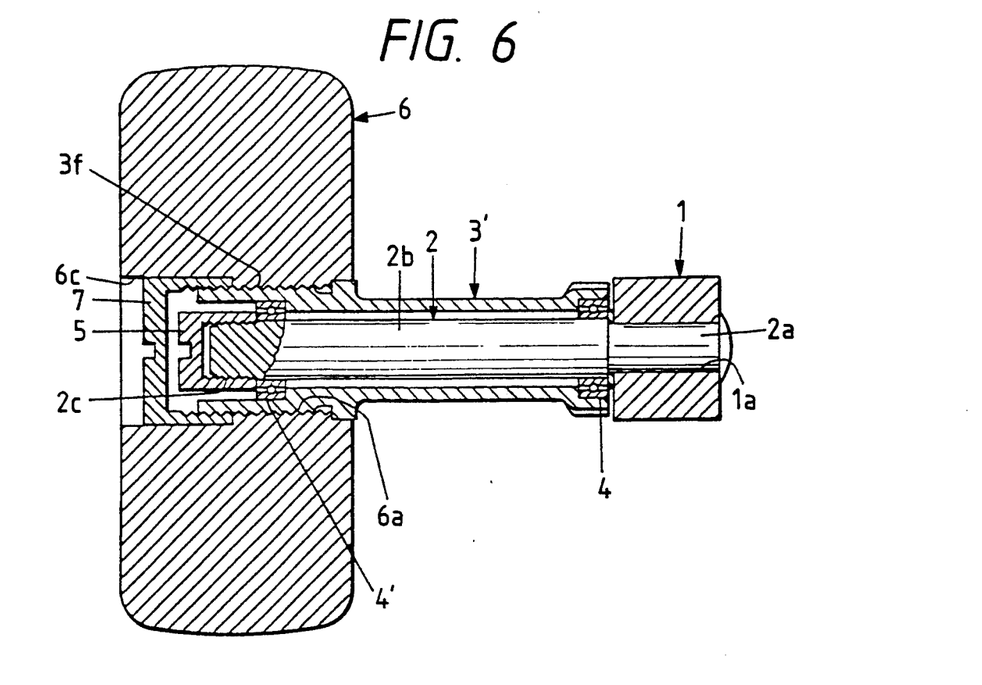
FIG. 6 is a longitudinally sectional view of a main part of a handle of a fourth embodiment.

FIG. 6 shows a fourth embodiment of a handle for a fishing reel according to the present invention. FIG. 6 is a longitudinally sectional view of a main part of the handle.

As shown in FIG. 6, the handle includes a handle knob separately formed from a hollow shaft part and threaded thereto to form a one-piece structure.

In FIG. 6, the handle knob 6 is made of, for example, synthetic resin and has an internally threaded part 6a formed in an inner periphery and a hollow part 6c formed form the substantially center toward the other side.

The internally threaded part 6a of the handle knob 6 is threaded to an externally threaded part 3f of the hollow shaft part 3'. A cap nut 7 corresponding to the dress plug 13 in the former embodiments is also threaded to that externally threaded part 3f.

Other construction is substantially the same as that of the third embodiment of the invention as shown in FIG. 5.

Figure 7:
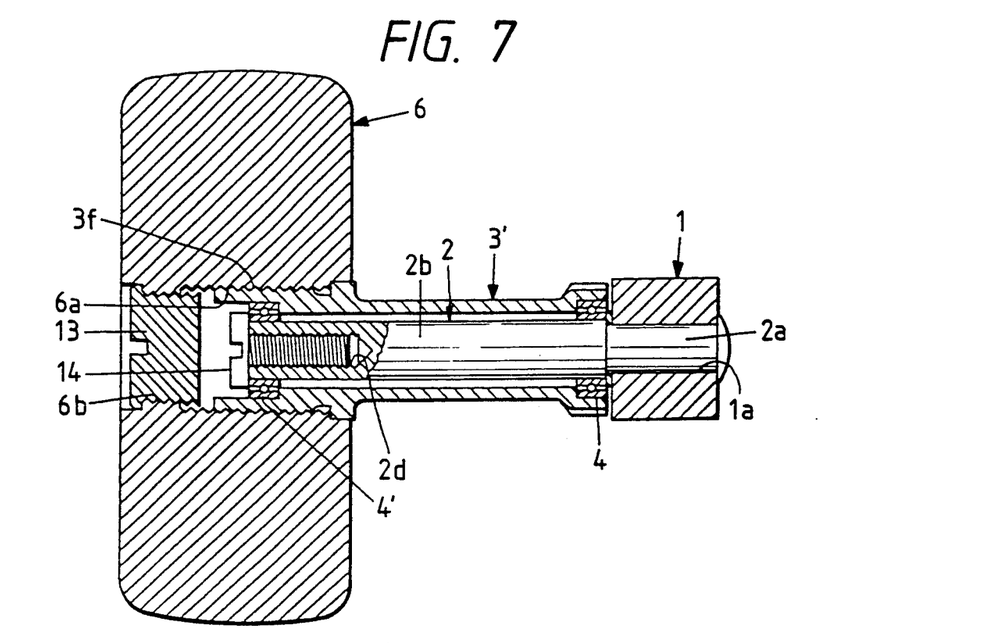
FIG. 7 is a longitudinally sectional view of a main part of a handle of a fifth embodiment.

FIG. 7 shows a fifth embodiment of a handle for fishing reel according to the present invention. FIG. 7 is a longitudinally sectional view of a main part of the handle.

As shown in FIG. 7, threaded to an externally threaded part 3f of a hollow shaft part 3' is an internally threaded part 6a of a handle knob 6 similarly to the third embodiment of the invention shown in FIG. 5.

A tapped hole 2d is formed in a support shaft 2 at the center of one end where the handle knob 6 is secured. A flat screw 14 is threaded to the tapped hole 2d so as to prevent the hollow shaft part 3' from falling off from the support shaft 2.

Other construction is substantially the same as that of the third embodiment of the invention shown in FIG. 5.

Figure 8:
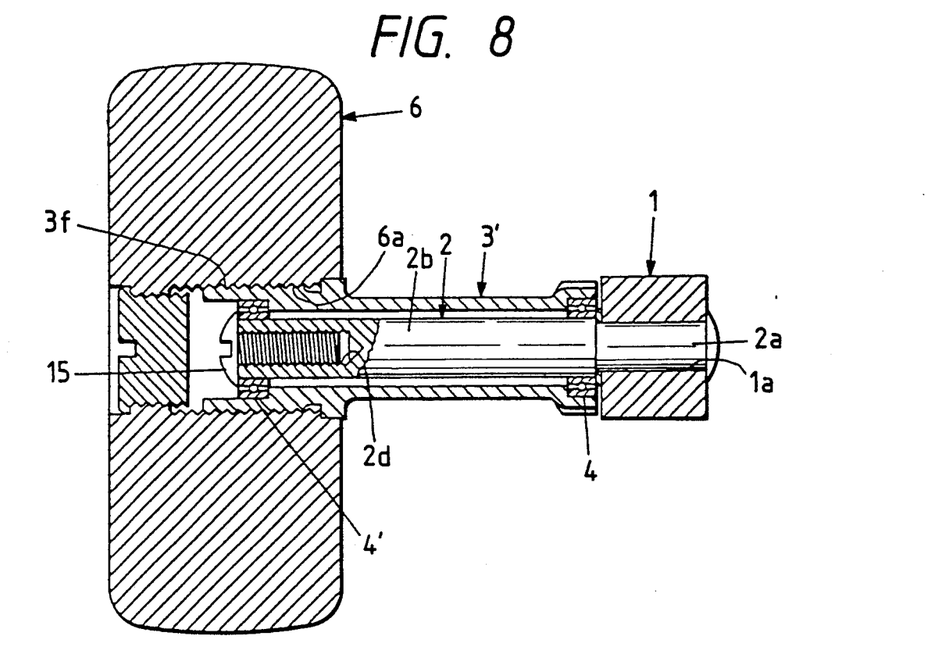
FIG. 8 is a longitudinally sectional view of a main part of a handle showing an alternative example of the fifth embodiment.

FIG. 8 shows a modified example of the fifth embodiment of a handle for a fishing reel according to the present invention. FIG. 8 is a longitudinally sectional view of a main part of the handle.

The construction shown in FIG. 8 is different from that of the fifth embodiment shown in FIG. 7 in that the flat screw 14 is replaced with a truss machine screw 15.

Other construction is substantially the same as that of the fifth embodiment of the invention shown in FIG. 7.

Figure 9:
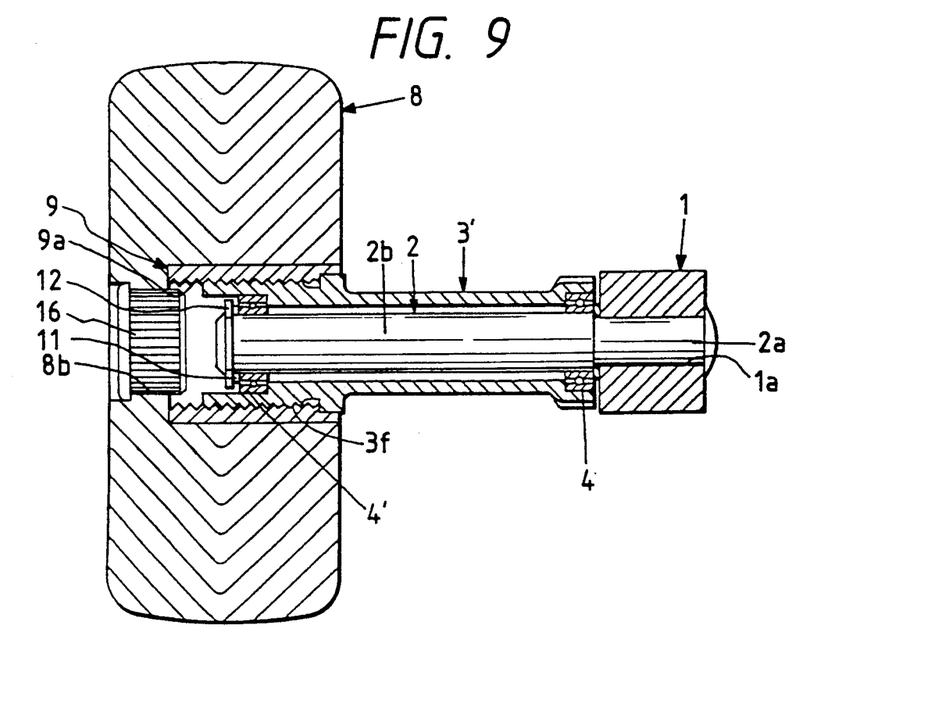
FIG. 9 is a longitudinally sectional view of a main part of a handle of a sixth embodiment.

FIG. 9 shows a sixth embodiment of a handle for a fishing reel according to the present invention. FIG. 9 is a longitudinally sectional view of a main part of the handle.

The handle knob 8 shown in FIG. 9 is made of reinforced wood.

In FIG. 9, formed at the center of a handle knob 8 made of the reinforced wood is a through hole of, for example, hexagonal shape into which a metal nut 9 is securely fitted.

An internally threaded part 9a of the nut 9 is threaded to an externally threaded part 3f of a hollow shaft part 3'. A dress plug 16 is secured to an aperture of a hollow part 8b of the handle knob 8 so as to cover the aperture.

The E-ring 12 is fitted to one end of a support shaft 2 where the handle knob 8 is provided with the washer 11 interposed between the E-ring 12 and the bearing member 4' so that the hollow shaft part 3' is prevented from falling off from the support shaft 2.

In the case where the handle knob is formed of the reinforced wood as described above, it can be mounted onto a high-price fishing reel and it can also provide smooth operation to that fishing reel in light of the structural arrangement of the present invention.

Figure 10:
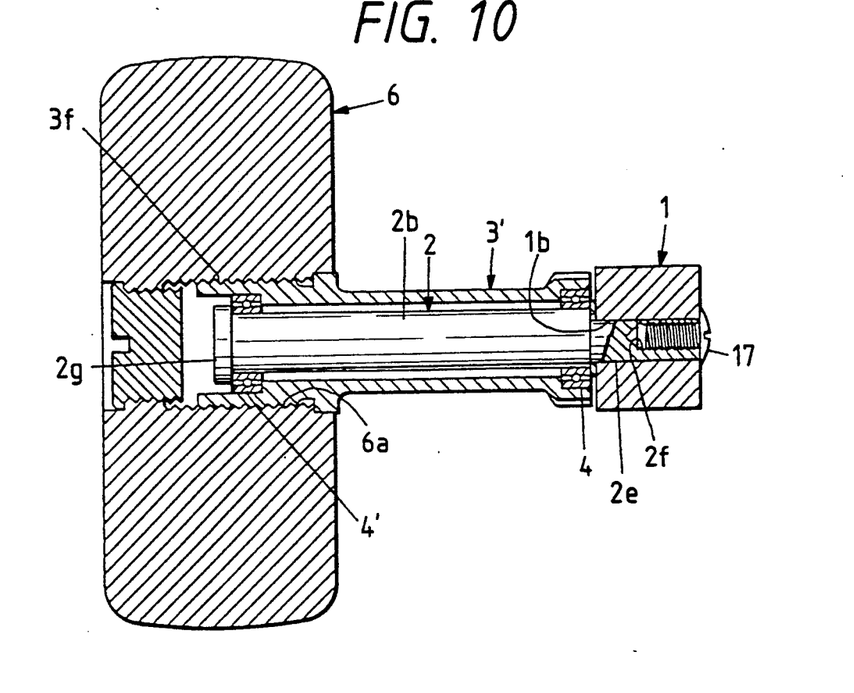
FIG. 10 is a longitudinally sectional view of a main part of a handle of a seventh embodiment.

FIG. 10 shows a seventh embodiment of a handle of a fishing reel according to the present invention. FIG. 10 is a longitudinally sectional view of a main part of the handle.

In the handle shown in FIG. 10, a handle arm 1 is formed with a D-shaped hole 1b into which a D-shaped small diameter part 2e of a support shaft 2 is inserted. The small diameter part 2e is formed with a tapped hole 2f with which a truss machine screw 17 is threadingly engaged so that the support shaft 2 detachably protrudes on a side face of the handle arm 1.

The support shaft 2 is formed at the other side thereof with a collar part 2g.

Other construction is substantially similar to that of the fifth embodiment of the invention shown in FIG. 7.

Figure 11:
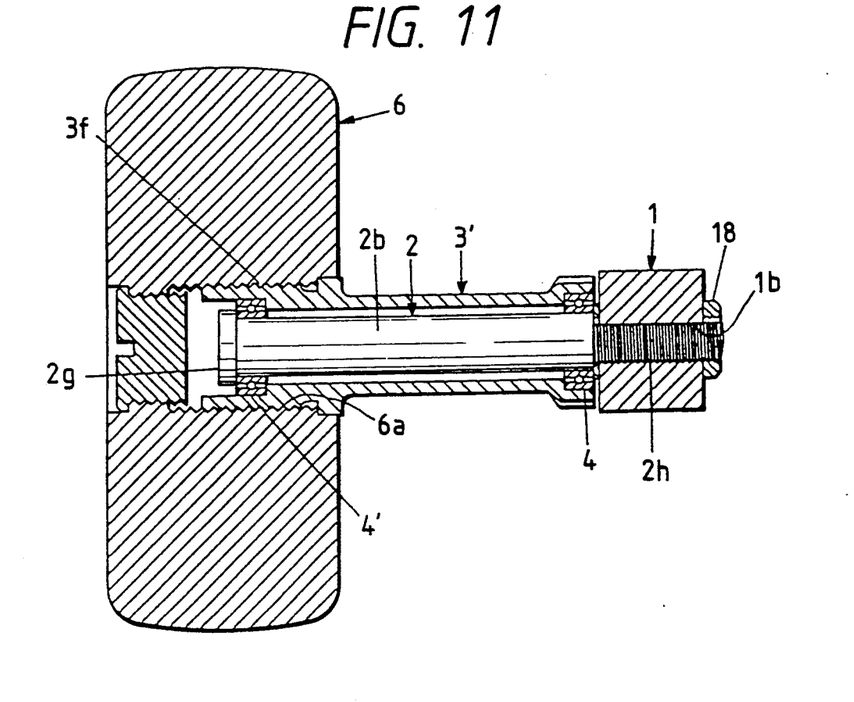
FIG. 11 is a longitudinally sectional view of a main part of a handle showing an alternative example of the seventh embodiment.

FIG. 11 shows a modified example of the seventh embodiment of a handle of a reel for fishing according to the present invention. FIG. 11 is a longitudinally sectional view of a main part of the handle.

In the handle shown in FIG. 11, the handle arm 1 has the D-shaped hole 1b into which a D-shaped and externally threaded small diameter part 2h of the support shaft 2 is inserted. A nut 18 is threaded to the D-shaped and externally threaded small diameter part 2h so that the support shaft 2 detachably protrudes on a side face of the handle arm 1.

Other construction is substantially similar to that of the seventh embodiment of the invention shown in FIG. 10.

The constructions shown in FIGS. 10 and 11 may be applied to the above described embodiments other than the fifth embodiment.

In the above explanation, although the bearing members 4,4' are constituted of the ball bearings, it will be readily appreciated that a sleeve is fitted to the outer periphery of the shaft part 2b as for the bearing members. In this case, the sleeve may be made of metallic material such as brass and sintered metal, or otherwise may be made of hard synthetic resins, ceramic or the like.

Further, in the above explanation, although the hollow support part 3 or 3' is attached to the handle arm 1 in a state that the washer 10 is fitted to the outer periphery of support shaft 2 near the small diameter part 2a, it will be understood that a protruding part is provided on the side face of the handle arm 1 toward the hollow shaft part 3 or 3', or on the side face of the latter toward the former in place of the washer 10.

As described above, according to the present invention, since the hollow shaft part is arranged to be detachably supported onto the support shaft, the frictional resistance in rotation between the support shaft and the hollow shaft part can be reduced through maintenance such as washing, lubrication. Therefore, there is provided for a fishing reel a handle generating an excellent effect in practice such as smooth winding operation for a fishing line with the handle knob gripped by hand.

It will be understood that modifications and variations may be effected without departing from the spirit and scope of the novel concepts of the present invention.

What is claimed is:

1. A handle for a fishing reel, comprising:
   a handle arm;
   a support shaft protruding on a side face of said handle arm;
   a hollow shaft part having a handle knob threadingly disposed thereon, and an axial hole passing therethrough, said axial hole having a first section and a second section having a diameter greater than said first section;
   plug means threadingly disposed within said axial hole at said second section for closing said axial hole;
   support means for rotatably and removably supporting said hollow shaft part onto said handle arm through said support shaft.

2. The handle according to claim 1, wherein said support means includes an E-ring fitted to an end of said support shaft, said end being inserted into said hollow shaft part.

3. The handle according to claim 1, wherein said support means includes a screw member threadingly engaged with an end of said support shaft, said end being inserted into said hollow shaft part.

4. The handle according to claim 1, wherein said support means includes a screw member threadingly engaged with an end of said support shaft, said end being inserted into said handle arm.

5. The handle according to claim 1, further comprising:
   bearing means provided between said support shaft and said hollow shaft part.

6. The handle according to claim 1, wherein at least a part of an inner circumferential surface of said hollow shaft part is radially separated from an outer circumferential surface of said support shaft.

7. The handle according to claim 1, support means comprises a fastening means threadingly disposed at an end of said support shaft for securing said hollow shaft part to said support shaft, said fastening means closing an end of said first section.

8. The handle according to claim 1, further comprising a washer disposed on said support shaft between said hollow shaft part and said side face, said washer covering one end of said axial hole.

9. The handle according to claim 1, wherein said plug is disposed completely within said axial hole.

* * * * *